Oct. 23, 1962    C. M. L. L. BOURCIER DE CARBON    3,059,314
BURNISHING TOOL
Filed May 21, 1959      3 Sheets-Sheet 1

INVENTOR
C. M. L. L. Bourcier de Carbon
BY Watson, Cole, Grindle & Watson
ATTORNEYS

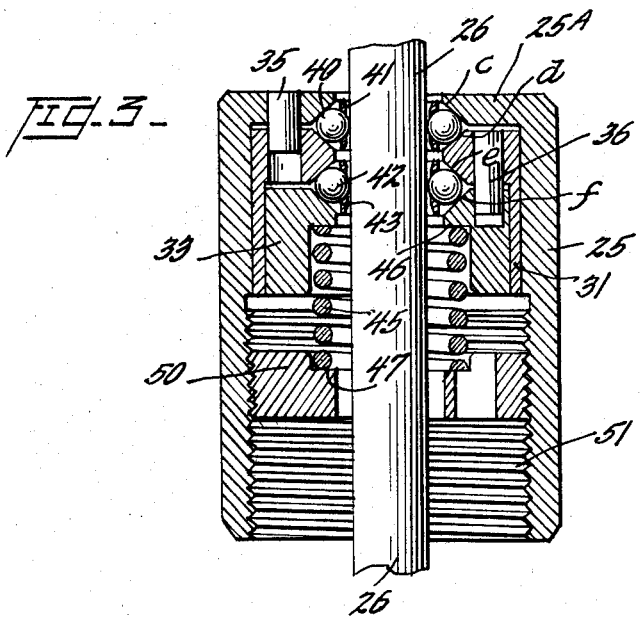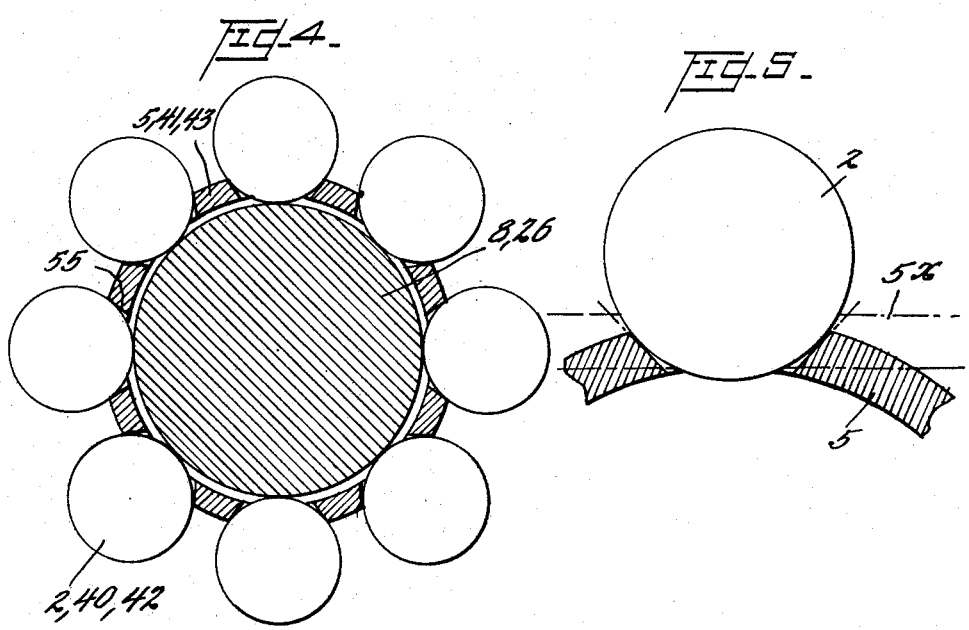

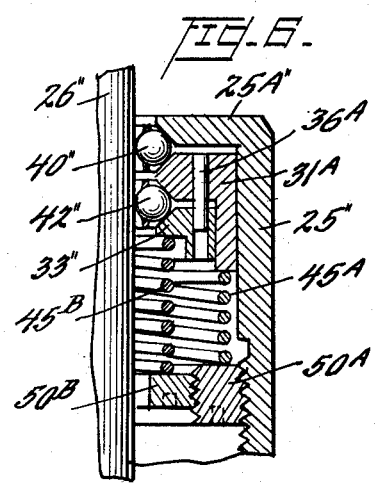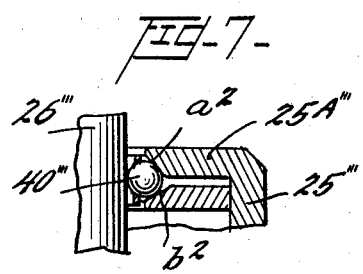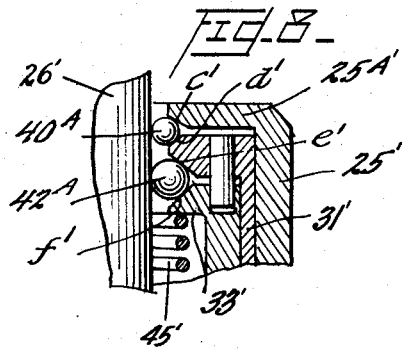

3,059,314
BURNISHING TOOL
Christian M. L. L. Bourcier de Carbon, 64 Blvd.
Maurice-Barres, Neuilly-sur-Seine, France
Filed May 21, 1959, Ser. No. 814,712
Claims priority, application France May 23, 1958
1 Claim. (Cl. 29—90)

This invention relates to burnishing metallic or similar surfaces to apply a highly polished and hardened finish thereon.

The primary object of the present invention is to provide methods and apparatus for obtaining a super-finish on the surface of cylindrical parts by means of a series of rolling balls which cold-roll the metallic surface and thus compact the surface and also smooth out even the microscopic roughness resulting from the machining of the metal article.

The invention is particularly applicable to applying a smooth hard glass-like surface to the piston rods of telescoping shock absorbers and to the inner surfaces of the shock absorber cylinders.

Other objects and features of novelty will be apparent from the following specification when read in connection with the accompanying drawings in which certain embodiments of the invention are illustrated by way of example.

In the drawings:

FIGURE 3 is a similar view through a device in which two series of burnishing balls are employed;

FIGURE 4 is an enlarged transverse sectional view taken through the series of burnishing balls and illustrating the spacer ring therefor;

FIGURE 5 is a fragmentary view on a further enlarged scale of a portion of the device shown in FIGURE 4 indicating the effect of bending the spacer ring; and FIGURES 6, 7 and 8 are fragmentary half vertical sectional views through certain variant forms of burnishing tools according to the invention.

Figure 1:
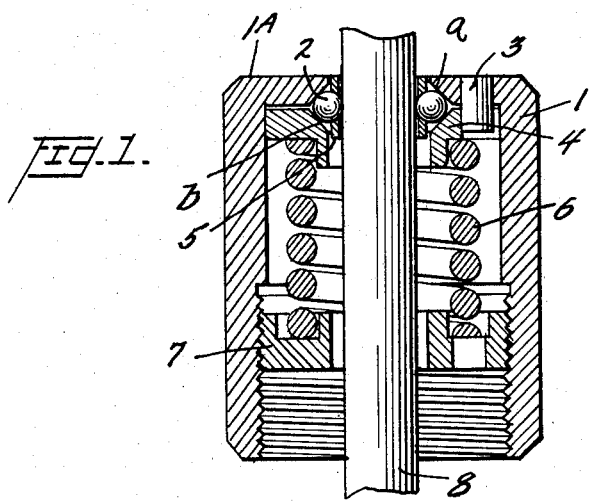
FIGURE 1 is a longitudinal sectional view taken through the axis of a burnishing device embodying the principles of the invention as applied to burnishing the surface of a rod-like article.

Referring now more particularly to FIGURE 1, the operative mechanism is enclosed in a cylindrical box-like casing 1 having an axial opening through an end wall 1A, a conical ramp $a$ being provided adjacent the opening.

A circular series of balls 2 held in position by an annular spacer ring or cage 5 is in rolling contact not only with the ramp $a$ of the casing 1 but also with the conical ramp surface $b$ of a spring-pressed annular collar 4. One or more pins 3 prevent the spring-pressed sliding member 4 from rotating with respect to the casing 1. A rather strong coil spring 6 urges the sliding member 4 against the balls and this spring is seated at its remote end against a threaded plug 7 which screws into the open remote end of the casing 1. This makes it possible to regulate the pressure of the spring on the burnishing balls.

A rod-like piece of work extends through the device and is denoted by the reference numeral 8.

In operation, with the rod 8 held stationary and the box or casing 1 rotating about the common axis, or conversely with the rod 8 rotating and the casing 1 held stationary, the rod is introduced axially within the series of balls 2.

The internal contact diameter of the circular series of balls 2, in repose, is of course somewhat smaller than the initial diameter of the rod and therefore upon introduction of the rod the circular series of balls will expand against the pressure of the ramp $b$ on the sliding member 4 as exerted by the spring 6. Upon relative axial movement between the rod and the burnishing tool the pressure of the balls against the rod as exerted by the spring and the ramp carrying members will serve to cold-roll and polish the metal surface.

Figure 2:
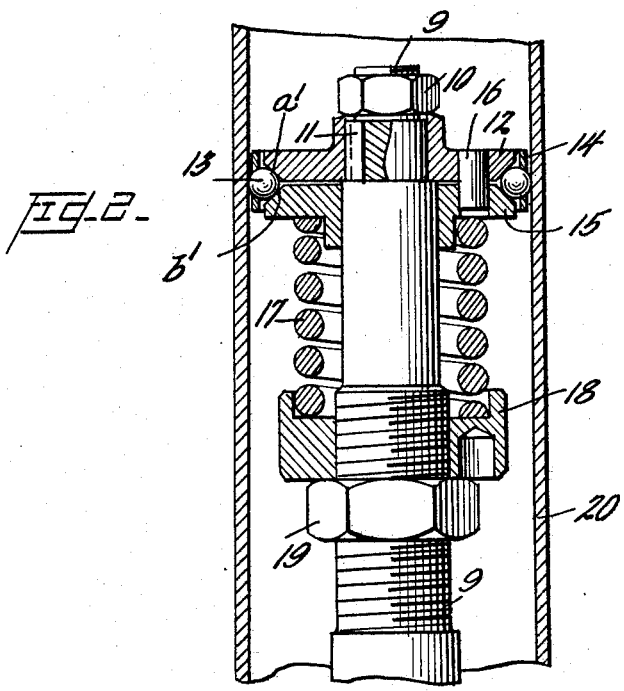
FIGURE 2 is a similar view of a tool adapted for use in burnishing the inner surface of a cylindrical article.

In the modification shown in FIGURE 2 of the drawings, the burnishing device is carried upon a shaft 9 and a disc element 12 provided with a ball contacting ramp around its periphery is fixed to the shaft by means of the nut 10 and the key 11. A series of balls 13 held in position by a cage 14 are in rolling contact with the ramp $a'$ of the member 12 and the ramp $b'$ of a sliding member 15, which is restrained from relative rotating motion with respect to the member 12 by means of the pin 16. A spring 17 is compressed between the member 15 and the adjustable abutment sleeve 18. The member 18 is threaded upon a portion of the shaft 9 and is held in adjusted position by means of a lock nut 19, whereby it is possible to adjust the spring pressure on the burnishing balls. The cylindrical workpiece in this embodiment is indicated at 20.

In operation, with the workpiece and the tool in relative rotation with respect to each other, the balls serve to burnish the inner surface of the cylinder 20 under the wedging pressure of the spring 17 and thus to cold-roll and polish the metallic surface.

It is obvious that in the case of both embodiments, several successive series of balls held under pressure by the same spring could be provided, as will now be described in connection with FIGURE 3 of the drawings. The outer casing 25 has an end wall 25A with an axial opening therein for the reception of the rod 26, an inclined ramp surface $c$ being provided around the opening. Axially inwardly of the end wall 25A of the casing 25 is the double ramped member 30 having a cylindrical skirt portion 31 snugly and slidably contacting the inner wall of the casing 25. The ramp surfaces of the member 30 are indicated at $d$ and $e$ respectively.

Still further inwardly another ramp carrying annular element 33 is provided, this element being fitted snugly within the skirt 31 of the element 30 and slidable therein. The ramp surface of the member 33 is indicated at $f$.

A pin 35 prevents relative rotation between the member 30 and the casing 25 and the pin 36 accomplishes the same purpose with respect to the elements 30 and 33.

Rotatably arranged within the cooperating ramp surfaces $c$ and $d$ of the members 25 and 30 are a series of burnishing balls 40 carried in a spacing ring or cage 41 and within the ramp surfaces $e$ and $f$ of the elements 30 and 33 a second series of burnishing balls 42 is disposed, these balls having a similar spacing cage 43.

A coil pressure spring 45 is seated against an inward annular shoulder 46 of the member 33 and also against a depressed annular seat 47 on the adjusting disc 50, this disc being threaded as at 51 within the housing 25.

The operation of this device will be readily apparent, the pressure of the single spring 45 being applied to both series of balls 40 and 42 to exert burnishing pressure upon the rod 26.

Referring now to FIGURES 4 and 5 of the drawings it will be seen that the series of balls 2, 40, 42 operate upon the shaft 8, 26 at equally spaced intervals around the shaft, the spacing being maintained by the cage or ring 5, 41, 43, the cage being provided with spaced openings 55 for the accommodation of the balls, these openings having tapered walls for more closely fitting the spherical curvature of the balls.

In FIGURE 5 of the drawings, one way of conforming the cage to the ball surfaces is suggested, where the original flat configuration 5X of the cage is indicated in broken lines and the final interfitting of the tapered opening with the surface of the ball 2 shown in solid section lines.

Further modifications may be made in the embodiments of the invention as illustrated herein. For example, the shaft (or inner cylindrical surface) can be treated in two or more stages during the same operation, burnishing balls of different diameter being provided, as shown in FIGURE 8 of the drawings where the first row of balls 40A is of a smaller diameter than the second row 42A. Of course, in this case the mutually facing conical surfaces $c1$ and $d1$, and $e1$ and $f1$, are of correspondingly greater dimensions. The parts designated 25', 25A', 26', 31', 33' and 45' are the equivalents of the parts designated 25, 25A, 26, 31, 33 and 45 of FIGURE 3. On the other hand, the series of balls could be arranged at different distances from the axis of the shaft, for the same purpose, namely in order to give successive burnishing treatment to the surface. Also, the two sets of balls may be influenced by two individual sets of springs, rather than using a single spring as shown in FIGURE 3, the compression of the springs being individually adjustable. This arrangement is shown in FIGURE 6 of the drawings where the intermediate sleeve member having the oppositely facing conical surfaces directed toward the respective series of balls 40" and 42", is urged upwardly by means of the outer coil spring 45A which is adjustably tensioned by means of the screw bushing 50A. In this embodiment, the inner race member or sleeve 33" is urged as in the embodiment illustrated in FIGURE 3 by means of the coil spring 45B. The adjustable annulus for providing a spring seat for the bottom of the spring 45B is indicated at 50B. Similar basic elements of the structure are designated with similar reference numerals with double primes.

Another modification contemplates the provision of angles on the two ramp faces slightly different one from the other in order to prevent the balls from rolling in a single direction and thus wearing flat. This differential angularity of the two ramps or guide faces will cause the balls to roll in all directions. This modification is shown in the fragmentary view of FIGURE 7 of the drawings where the conical face $a2$ has a different inclination from the mutually facing conical face $b2$. Parts 25''', 25A''', 26''' and 40''' are the equivalents of the corresponding parts designated 25, 25A, 26 and 40 in FIGURE 3.

Further modifications may be made in the invention without departing from the scope thereof as defined in the following claim.

Having thus described the invention, what is claimed as new and desired to be secured by Letters Patent is:

A burnishing tool for improving the cylindrical surface on a piece of work, said tool comprising a generally cylindrical carrier member for relative axial movement with relation to such a cylindrical surface, two axially spaced annular series of hardened metallic burnishing balls rotatably and adjustably supported by said carrier member and adapted to be brought into radial contact with such a cylindrical surface, said carrier member having an annular conically bevelled wedging surface thereon near its outer end and directed generally axially inwardly of the member, an axially movable double conical sleeve member carried by said carrier member and disposed axially inwardly of said first named conical surface and having one of its conical surfaces facing generally outwardly toward the first named conical surface on said carrier member and the other conical surface facing generally axially inwardly, a second axial sleeve member carried by said carrier member axially inwardly of said first named sleeve member and having an annular conical surface facing generally outwardly toward the second conical surface of said first named sleeve member, one annular series of balls disposed between the first pair of mutually facing conical surfaces and the other disposed between the second pair of mutually facing conical surfaces, adjustable spring means carried by said carrier member and urging the mutually facing conical surfaces of each pair together against the series of balls therebetween, the balls of the respective series being of different diameters.

References Cited in the file of this patent

UNITED STATES PATENTS

| | | |
|---|---|---|
| 1,010,127 | Dungley | Nov. 28, 1911 |
| 1,318,194 | Woodvine | Oct. 7, 1919 |
| 1,683,044 | Mongeau | Sept. 4, 1928 |
| 2,541,455 | Anderson | Feb. 13, 1951 |

FOREIGN PATENTS

| | | |
|---|---|---|
| 678,070 | France | Dec. 23, 1929 |
| 692,468 | Germany | June 20, 1940 |
| 887,921 | Germany | Aug. 27, 1953 |
| 923,953 | Germany | Feb. 24, 1955 |
| 935,476 | Germany | Nov. 17, 1955 |
| 952,954 | Germany | Nov. 22, 1956 |